J. H. DEAN.
VARIABLE SPEED AND DRIVING MECHANISM.
APPLICATION FILED JULY 10, 1916.
1,257,462.
Patented Feb. 26, 1918.
3 SHEETS—SHEET 1.
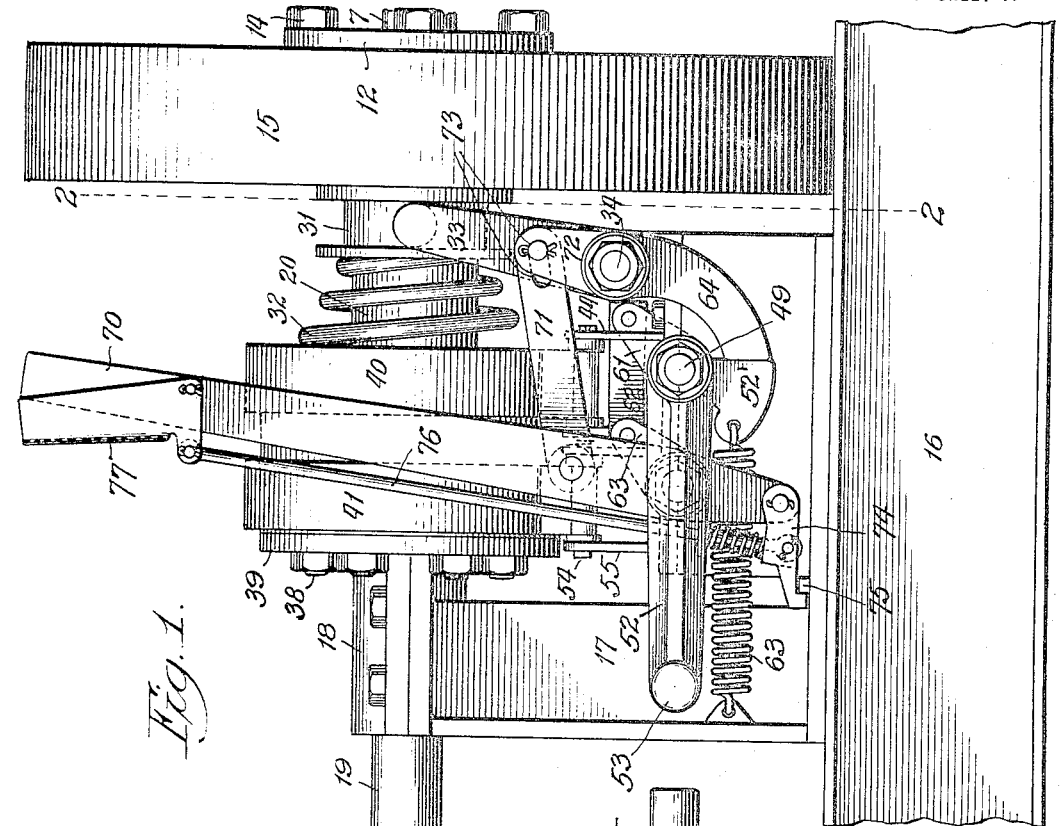
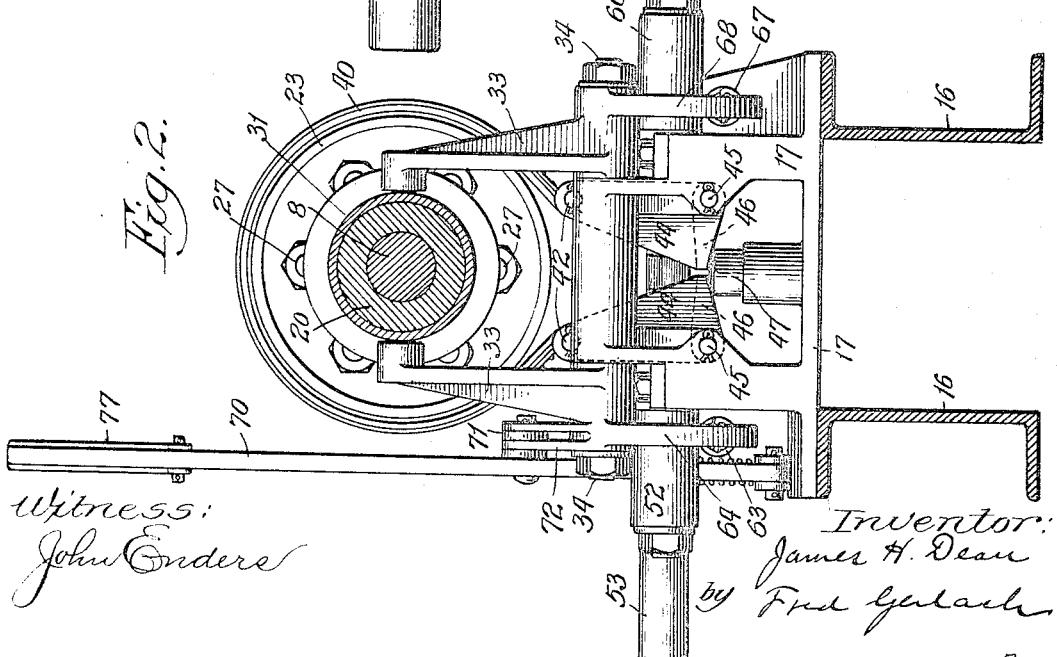
Witness:
John Enders
Inventor:
James H. Dean
by Fred Gerlach
his Atty.

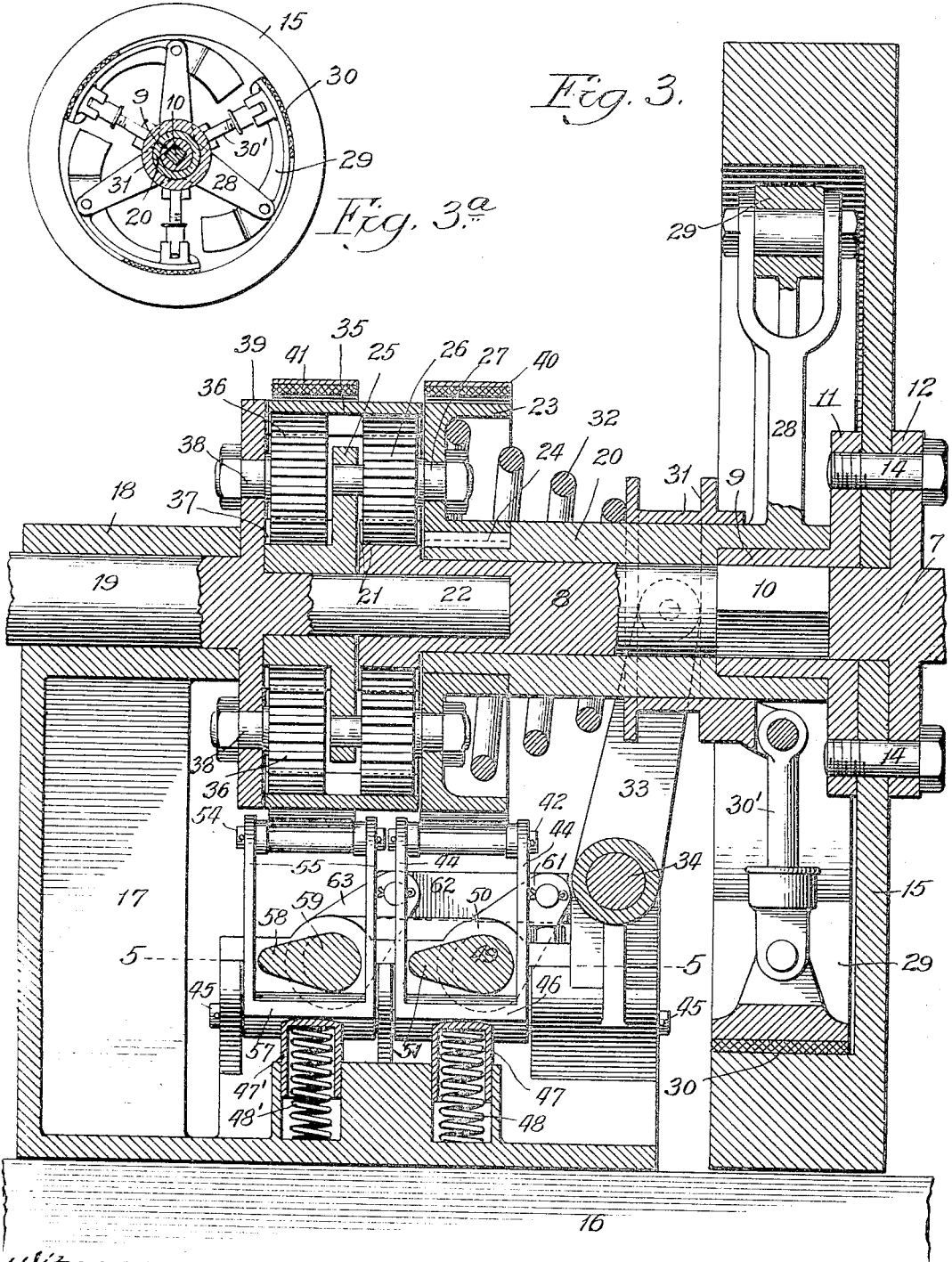

J. H. DEAN.
VARIABLE SPEED AND DRIVING MECHANISM.
APPLICATION FILED JULY 10, 1916.
1,257,462.
Patented Feb. 26, 1918.
3 SHEETS—SHEET 3.
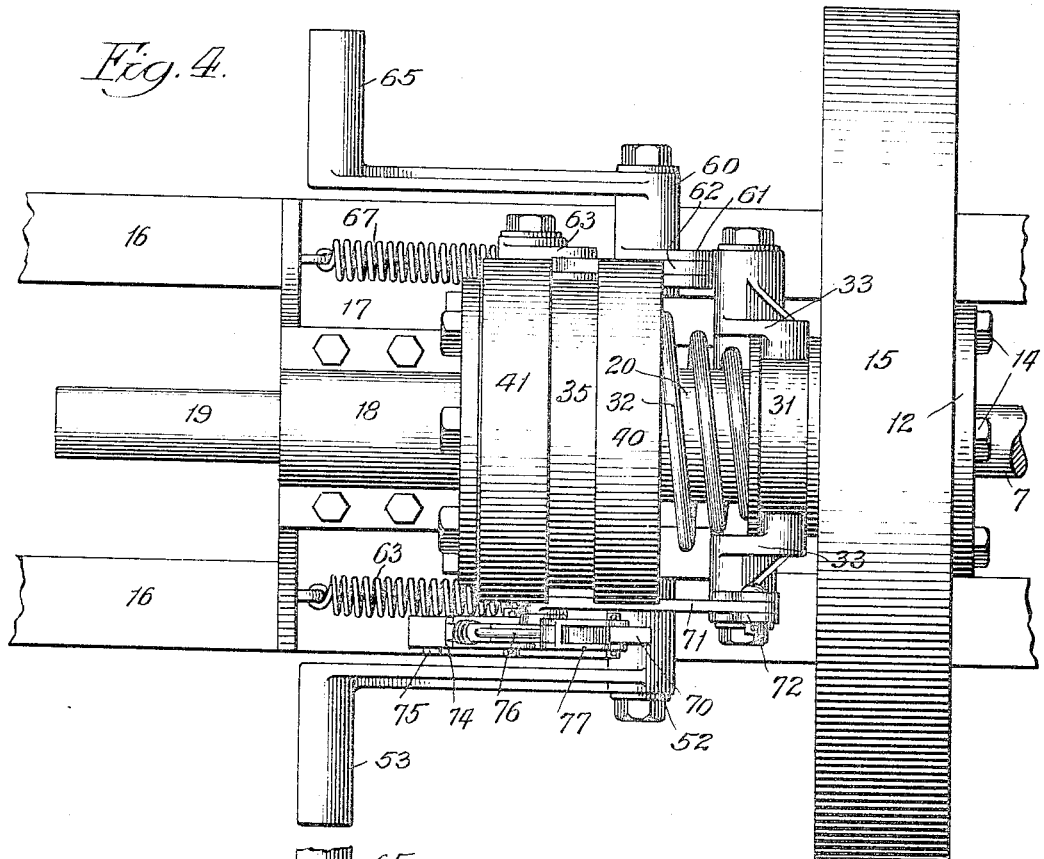
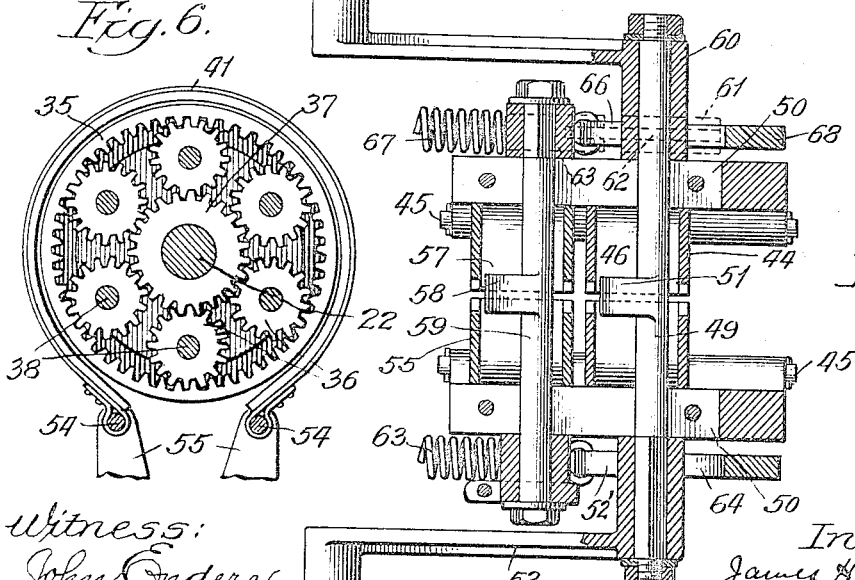
Witness:
John Enders
Inventor:
James H. Dean
by Fred Gerlach
his Atty.

UNITED STATES PATENT OFFICE.

JAMES H. DEAN, OF LUDINGTON, MICHIGAN, ASSIGNOR TO JUSTUS S. STEARNS, OF LUDINGTON, MICHIGAN.

VARIABLE-SPEED AND DRIVING MECHANISM.

1,257,462.  Specification of Letters Patent. Patented Feb. 26, 1918.

Application filed July 10, 1916. Serial No. 108,280.

*To all whom it may concern:*

Be it known that I, JAMES H. DEAN, a citizen of the United States, and a resident of Ludington, in the county of Mason and State of Michigan, have invented certain new and useful Improvements in Variable-Speed and Driving Mechanism, of which the following is a full, clear, and exact description.

The invention relates to variable speed and reversible driving mechanism.

One object of the invention is to provide improved variable speed driving mechanism of the type adapted for use on tractors, and another object is to provide improved controlling mechanism therefor.

The invention consists in the several novel features hereinafter set forth and more particularly defined by claims at the conclusion hereof.

In the drawings: Figure 1 is a side elevation of mechanism embodying the invention. Fig. 2 is a section taken on line 2—2 of Fig. 1. Fig. 3 is a central vertical longitudinal section. Fig. 3ª is a detail of the friction-clutch. Fig. 4 is a plan and Fig. 5 is a section taken on line 5—5 of Fig. 3. Fig. 6 is a detail showing the internally toothed gear ring and the planetary pinions and drive pinion within the ring.

A drive shaft comprising co-axial members 7 and 8 is driven from any suitable source and sustained in any suitable manner. Shaft-members 7 and 8 are removably connected by means of a sleeve 9 fitting around the squared end 10 of member 8, a flange 11 on said sleeve, a flange 12 on shaft 7 and bolts 14 which secure said flanges together and secure a clutch-wheel 15 between them. In operation, members 7 and 8 and clutch-wheel 15 rotate together, the connection between these parts being for convenience in assembling and disconnecting them. The mechanism is illustrated as mounted above and sustained by a pair of frame-bars 16 of a tractor. A bracket 17 is secured to the frame-bars 16 and is provided with a bearing 18 for the driven shaft 19. A sleeve 20 is rotatably mounted on the drive-shaft members 8 and 10, being confined against longitudinal movement thereon between a drive pinion 21 and sleeve 9. The driven shaft 19 is coaxial with the drive-shaft and is provided with a spindle 22 extending into shaft-member 8 to hold the driven shaft in coaxial relation. A pulley 23 is secured to sleeve 20 by a key 24 and a supporting ring 25 is journaled on the spindle 22. A series of pinions 26 are mounted on the spindles 27 which are sustained in the pulley 23 and ring 25. Pulley 23 and ring 25 which are connected by the spindles 27, so they will rotate together, are adapted to be driven by the clutch wheel 15. For this purpose, arms 28 are rigid on sleeve 20 and shoes 29 are pivoted to said arms to engage an internal friction driving face 30 on the clutch wheel 15 and a clutch-collar 31 slidably mounted on the sleeve 20 is operatively connected to said shoes by links 30' so that when the collar is operated into position to force the movable ends of the shoes 29 outwardly, the constantly rotating clutch-wheel will drive shoes 29 and cause arms 28, sleeve 20, pulley 23 and ring 25 to rotate with drive-shaft members 8 and 10. A coil-spring 32 is disposed between pulley 23 and clutch collar 31 to hold the shoes into engagement with the clutch-wheel. Arms 33 fixed to a shaft 34 have their upper ends extended into the annular groove of collar 31 to control the operation of the clutch.

Pinions 26 mesh with the drive-pinion 21 on shaft-member 8 and with the teeth of a floating internal gear ring 35. A series of pinions 36 mesh with the teeth of gear ring 35 and a pinion 37 formed on the ring 25. Pinions 36 are mounted on the studs 38 which are suitably fixed in a flange 39 rotating with the driven shaft 19.

A brake-band 40 is adapted to engage the periphery of pulley 23 to secure said pulley and shafts 27 of pinions 26 to be held to prevent the planetary movement of said pinions against rotation. A brake-band 41 is adapted to be applied to the periphery of gear-ring 35 to effect the planetary movement of pinions 26 and 36 and cause the driven shaft to be driven at low speed.

The ends of the brake-band 40 are secured respectively to pins 42. Each of said pins is carried in a lever 44 which is pivotally mounted in supporting bracket 17 by a pin 45. Each of said levers is provided with an inwardly extending arm or lug 46 and a plunger 47 pressed upwardly by a spring 48 engages the adjacent end portions of said arms or lugs 46 to normally hold the levers in position to free the brake-band 40 from the pulley 23. A cross-shaft 49 journaled in bearings 50 on brackets 17 is provided with an integral arm or lug 51 which is adapted to engage the arms 46 of both levers 44 and swing the upper ends of said levers inwardly to contract the brake-band 40 and cause it to grip the periphery of pulley 23. A crank 52 fixed to one end of shaft 49 is provided with a handle or foot-piece 53 whereby the shaft may be rocked to operate said brake-band. Levers 44 operate as bell-crank levers for contracting and expanding the brake-band. The hub of lever 52 is provided with an abutment-arm 52' and a spring 63 is applied to said arm to operate said lever and its connections into position to normally release the brake-band 40. Said arm 52' is disposed to engage an arm 64 integral with one of the clutch-releasing arms 33 to cause the arms 33 to render the friction-clutch inoperative whenever the brake-band is applied to pulley 23 to reverse the direction in which the driven-shaft 19 will be operated.

The lower ends of brake-band 41 are connected to pins 54 mounted in the upper end of elbow-levers 55 which are similar in construction to the levers 44. These levers 55 are pivoted in brackets 17 by pins 45 and are each provided with an inwardly extending lug or arm 57 adapted to be operated by a lug or arm 58 integral with a cross-shaft 59 which is mounted in bearings 50. A lever 60 pivoted on one end of cross-shaft 49 is formed with an arm 61 which is connected by a link 62 to an arm 63 which is rigidly secured to one end of the shaft 59. A handle or foot-piece 65 is formed on the outer end of lever 60. An abutment-arm 66, similar to the abutment arm 52' is formed on lever 60 and a spring 67 is connected to said abutment arm so as to normally hold the arm 60 in position to release the brake-band 41. Arm 66 is adapted to engage an arm 68 on one of the arms 33 and similar to arm 64, to cause the clutch-releasing arms 33 to release the clutch when the brake 41 is applied to cause the shaft 19 to be driven at low speed. A plunger 47' pressed upwardly by a spring 48' acts to release the brake-band 41 when lever 60 is released.

A hand lever 70 pivoted on one end of shaft 59 which is connected by a link 71 to an arm 72 on one of the clutch-releasing arms 33, serves to control the operation of the friction-clutch independently of the low-speed lever 65 and the reversing lever 53. A stud-and-slot connection 73 between arm 72 and link 71 permits the clutch-releasing arms to be operated independently of lever 70. A locking dog 74 is pivoted to the lower end of lever 70, and is adapted to engage a hook on lug 75 whereby the lever will be locked in position to leave the clutch operative. Dog 74 is connected by a spring pressed rod 76 to a releasing lever 77. By releasing the dog 74 and shifting the lever to bring the dog to the other side of the lug 75 from that shown in Fig. 1, the clutch may be held in released position when the gearing is to remain neutral.

The operation of the improved mechanism will be as follows: When the shaft 19 is to be driven at low speed, lever 65 will be pushed downwardly to rock shaft 59 through links 62 and arms 61 and 63 and to cause lug 58 to operate levers 55 to apply the brake-band 41 to the gear-ring 35. Arm 66 on the low-speed lever 60 will also engage arm 68 to rock shaft 34 and arms 33 to slide clutch-collar 31 and withdraw the shoes 30 from the clutch wheel. Thereupon, the friction clutch will be inoperative and gear-ring 35 will be locked against rotation. In this position of the parts, pinion 21 meshing with the pinions 26, because pulley 23 and ring 25 are free to rotate, the shaft 19 will be driven at low-speed resulting from the planetary movement of the pinions.

To operate the shaft 19 at high speed, lever 70 will be set in position shown in Fig. 1, to cause the friction clutch to be operative to drive the pulley 23. Gear-ring 35, pinions 36 will then all rotate together to cause the shaft 19 to be driven at the same speed as the shaft-member 8. This will result from driving the pulley 23 through the clutch and the pinion 26 from the shaft-member 8, the gear ring 35 acting as a lock between pinions 26 and 36 to cause them to move bodily around the drive and driven shafts and without moving about their own axes.

To reverse the direction of the driven shaft, lever 52 will be depressed to rock shaft 49 and lug 51 which will operate the levers 44 to apply the brake-band 40 to pulley 23 and cause abutment arm 52' to operate arms 64 to release the clutch. In this position of the parts, pulley 23 will be held against rotation so that the drive-pinion 21 will rotate the pinions 26 around their own axes. These pinions will rotate the gear ring 35 which will impart a planetary movement to the pinions 36 which are connected to the driven shaft 19, the inner portions of pinions 36 being held by pinion 37 on ring 25 which is held against rotation by reason of its connection to pulley 23.

By reason of the pin and slot connection 73 between arms 72 and links 71, the clutch can be released either by the low speed lever or reversing lever while the lever 70 is in position shown in Fig. 1. This makes it possible to operate either the low speed lever or the reversing lever without first shifting the lever 70 to a neutral position and to permit the low speed and reversing levers to effect a change in the gearing from the high speed position.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In variable speed driving mechanism, the combination of a drive shaft, a pinion on said drive shaft, a pulley on said drive shaft, planetary pinions on the pulley, a clutch for driving said pulley from the drive shaft, a supporting ring connected to rotate with said pulley, a pinion on said supporting ring, a driven shaft, planetary pinions on the driven shaft, an internally toothed ring meshing with the planetary pinions on the pulley and the planetary pinions on the driven shaft, means for holding the pulley against rotation, means for holding the internally toothed ring against rotation, and controlling means for the holding means for the pulley and the ring.

2. In variable speed driving mechanism, the combination of a drive-shaft, a pinion on said drive-shaft, a pulley on said shaft, planetary pinions on the pulley, a clutch for driving said pulley from the drive shaft, a supporting ring connected to rotate with said pulley, a pinion on said supporting ring, a driven shaft, planetary pinions on the driven shaft, an internally toothed ring meshing with the planetary pinions on the pulley and the planetary pinions on the driven shaft, means for holding said pulley against rotation, controlling means for the holding means for the pulley, means for holding the internally toothed ring against rotation, controlling means for the holding means for the internally toothed gear ring, and clutch-controlling means operable by the controlling means for the pulley and for the internally toothed ring.

3. In variable speed driving mechanism, the combination of a drive shaft, a pinion on said drive-shaft, a pulley on said shaft, planetary pinions on the pulley, a friction-clutch for driving said pulley from the drive shaft, a supporting-ring connected to rotate with said pulley, a pinion on said supporting ring, a driven shaft, planetary pinions on the driven shaft, an internally toothed ring meshing with the planetary pinions on the pulley and the planetary pinions on the driven shaft, a brake-band for the pulley, a brake-band for said internally toothed ring, a controlling lever for the brake-band for the pulley, a controlling lever for the brake-band for the internally toothed gear ring, and clutch-controlling means operable by both of said levers.

4. In variable speed driving mechanism, the combination of a drive shaft, a pinion on said drive shaft, a pulley on said shaft, planetary pinions on the pulley, a friction clutch for driving said pulley from the drive-shaft, a supporting ring connected to rotate with said pulley, a pinion on said supporting ring, a driven shaft, planetary pinions on the driven shaft, an internally toothed ring meshing with the planetary pinions on the pulley and the planetary pinions on the driven shaft, means for holding said pulley against rotation, means for holding said internally toothed ring against rotation, a controlling lever for the holding means for the pulley, a controlling lever for the holding means for the internally toothed gear ring, and clutch-controlling means operable by both controlling levers.

5. In variable speed driving mechanism, the combination of a drive shaft, a pinion on the drive shaft, a driven shaft, gearing between the drive pinion and the driven shaft comprising a wheel, a brake-band for holding said wheel against rotation, and means for operating the brake band comprising a pair of bell-crank levers to which the ends of the brake-band are respectively connected, a cross shaft and a single arm on the cross shaft to operate both of the levers.

6. In variable speed driving mechanism, the combination of a drive shaft, a pinion on the drive shaft, a driven shaft, gearing between the drive pinion and the driven shaft comprising a wheel, a brake-band for holding said wheel against rotation, means for operating the brake band comprising a pair of bell-crank levers to which the ends of the brake-band are respectively connected, a cross-shaft and an arm on the cross shaft to operate both of the levers, a clutch between the drive shaft and the pulley and clutch-releasing means operated by the cross-shaft.

7. In variable speed driving mechanism, the combination of a drive shaft, a pinion on the drive shaft, a driven shaft, gearing between the drive pinion and the driven shaft comprising a wheel, a brake-band for holding said wheel against rotation, means for operating the brake-band comprising a pair of bell-crank levers to which the ends of the brake band are respectively connected, a cross shaft and an arm on the cross shaft to operate both of the levers, a clutch between the drive shaft and the pulley, clutch-releasing means operated by the cross shaft, and spring-means for releasing the brake-band.

8. In variable speed driving mechanism, the combination of a drive shaft, a pinion on the drive shaft, a driven shaft, gearing between the drive pinion and the driven shaft comprising a wheel, a brake-band for holding said wheel against rotation, means for operating the brake-band comprising a pair of bell-crank levers to which the ends of the brake-band are respectively connected, a cross-shaft and an arm on the cross shaft to operate both of the levers, a clutch between the drive shaft and the pulley, clutch-releasing means operated by the cross-shaft, and spring-means applied to the bell-crank levers to release the brake-band.

9. In variable speed driving mechanism, the combination of a drive shaft, a pinion on the drive shaft, a driven shaft, gearing between the drive pinion and the driven shaft comprising planetary pinions, a pulley and a gear ring, a brake band for holding the pulley against rotation, a brake-band for holding the gear-ring against rotation, a clutch between the pulley and the drive shaft, controlling mechanism for the brake-bands, comprising a pair of cross shafts, each provided with means for operating one of the brake-bands, comprising a pair of cross-shafts, each provided with means for operating one of the brake-bands, two levers fixed and pivoted respectively on one of the cross-shafts, and an arm and link connection between said lever and the other of said shafts.

10. In variable speed driving mechanism, the combination of a drive shaft, a pinion on the drive shaft, a driven shaft, gearing between the drive pinion and the driven shaft comprising planetary pinions a pulley and a gear ring, a brake-band for holding the pulley against rotation, a brake band for holding the gear ring against rotation, a clutch between the pulley and the drive shaft, controlling mechanism for the brake-bands, comprising a pair of cross shafts, each provided with means for operating one of the brake bands, two levers fixed and pivoted respectively on one of the cross-shafts, an arm and link connection between said lever and the other of said shafts, and spring-means for releasing the bands and retracting the levers.

11. In variable speed driving mechanism, the combination of a drive shaft, a pinion on the drive shaft, a driven shaft, gearing between the drive pinion and the driven shaft comprising planetary pinions and a pulley, a brake band for holding the pulley against rotation, a clutch between the pulley and the drive shaft, controlling mechanism for the brake-band comprising a cross shaft provided with means for operating the brake-band, a lever for shifting the cross-shafts, and an abutment on the lever for releasing the clutch.

12. In variable speed driving mechanism, the combination of a drive shaft, a pinion on the drive-shaft, a driven shaft, gearing between the drive pinion and the driven shaft comprising planetary pinions, a wheel and a gear ring, a brake band for holding the pulley against rotation, a brake band for holding the gear ring against rotation, a friction clutch between the pulley and the drive shaft, controlling mechanism for the brake bands comprising a pair of cross shafts each provided with means for operating one of the brake bands, two levers fixed and pivoted respectively on the cross shafts, an arm-and-link connection between said lever and the other of said shafts, springs for retracting said levers and separate spring-devices for retracting said cross-shafts.

JAMES H. DEAN.